United States Patent
Nomaru

(10) Patent No.: US 11,919,114 B2
(45) Date of Patent: Mar. 5, 2024

(54) MEASURING APPARATUS FOR MEASURING POSITIONAL RELATION BETWEEN A CHUCK TABLE AND A PROCESSING TOOL

(71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 751 days.

(21) Appl. No.: 17/015,481

(22) Filed: Sep. 9, 2020

(65) Prior Publication Data

US 2021/0069848 A1  Mar. 11, 2021

(30) Foreign Application Priority Data

Sep. 11, 2019 (JP) .................... 2019-165308

(51) Int. Cl.
*B23Q 17/22* (2006.01)
*B23Q 3/06* (2006.01)
(Continued)

(52) U.S. Cl.
CPC .............. *B23Q 17/22* (2013.01); *B23Q 3/06* (2013.01); *B23Q 17/2428* (2013.01);
(Continued)

(58) Field of Classification Search
CPC ....... G01B 11/14; G01B 11/002; G01B 11/03; G01J 3/0208; G01J 1/0411; G01J 1/0414; B23Q 17/22; B23Q 3/06; B23Q 17/2428; B23Q 2703/02; B23Q 17/248; B23Q 17/2233; H01L 21/67256; H01L 21/67092; B26D 7/2628
See application file for complete search history.

(56) References Cited

U.S. PATENT DOCUMENTS

2008/0170243 A1* 7/2008 Nomaru ............ H01L 21/67253
356/634
2008/0204748 A1* 8/2008 Nomaru ............. B23K 26/0853
356/332
(Continued)

FOREIGN PATENT DOCUMENTS

JP            07130692 A    5/1995
JP         2019091781 A    6/2019

*Primary Examiner* — Edmond C Lau
*Assistant Examiner* — Langston Anthony Parks
(74) *Attorney, Agent, or Firm* — Greer Burns & Crain Ltd.

(57) ABSTRACT

A measuring apparatus for measuring positional relation between a chuck table for holding a workpiece thereon and a processing tool for processing the workpiece held on the chuck table. The measuring apparatus includes a broadband light source, a mirror for reflecting light emitted from the broadband light source to travel toward the processing tool, a chromatic aberration condensing lens disposed between the broadband light source and the mirror or between the mirror and the processing tool, a light branching unit branching reflected light from the processing tool that has been reflected by the mirror and traveled back through the chromatic aberration condensing lens, and a position detecting unit detecting the position of the processing tool on the basis of intensity of the reflected light that corresponds to a wavelength of the reflected light branched by the light branching unit.

5 Claims, 5 Drawing Sheets

(51) Int. Cl.
*B23Q 17/24* (2006.01)
*G01B 11/00* (2006.01)
*G01B 11/14* (2006.01)
*G01J 3/02* (2006.01)

(52) U.S. Cl.
CPC ............ *G01B 11/002* (2013.01); *G01B 11/14* (2013.01); *G01J 3/0208* (2013.01); *B23Q 2703/02* (2013.01)

(56) References Cited

U.S. PATENT DOCUMENTS

2015/0287179 A1\* 10/2015 Nomaru ............... G01B 11/306 382/149
2019/0074221 A1\* 3/2019 Nomaru ................ B23K 26/53

\* cited by examiner

MEASURING APPARATUS FOR MEASURING POSITIONAL RELATION BETWEEN A CHUCK TABLE AND A PROCESSING TOOL

BACKGROUND OF THE INVENTION

Field of the Invention

The present invention relates to a measuring apparatus for measuring positional relation between a chuck table for holding a workpiece thereon and a processing tool for processing the workpiece held on the chuck table.

Description of the Related Art

Wafers where a plurality of devices such as integrated circuits (ICs), large scale integration (LSI) circuits, etc. are formed in respective areas demarcated on the face sides thereof by a plurality of projected dicing lines are thinned to a desired thickness by a grinding apparatus that grinds the reverse sides of the wafers, and then divided into individual device chips by a dicing apparatus. The device chips divided from the wafers will be used in electric equipment such as mobile phones, personal computers, etc.

The grinding apparatus includes a chuck table for holding a wafer thereon and a grinding unit having a rotatable grinding stone for grinding the wafer held on the chuck table, and is able to grind the wafer with high precision (see, for example, Japanese Patent Laid-open No. Hei 07-130692).

Furthermore, the dicing apparatus includes a chuck table for holding a wafer thereon and a cutting unit having a rotatable cutting blade for cutting the wafer held on the chuck table, and is able to divide the wafer into individual device chips with high precision (see, for example, Japanese Patent Laid-open No. 2019-091781).

SUMMARY OF THE INVENTION

In order for either one of the grinding apparatus and the dicing apparatus to maintain a high-precision processing capability, it is necessary to accurately control the positional relation between a holding surface, i.e., an upper surface, of the chuck table and a processing tool, i.e., the grinding stone or the cutting blade, for processing the wafer on the holding surface. On the conventional grinding apparatus, for controlling the grinding feeding of the grinding unit, it is customary to determine a home position for accurately identifying the position of the lower surface of the grinding stone by bringing the lower surface of the grinding stone closely to and then into slight contact with the upper surface of the chuck table. However, the operator is required to be experienced and skilled to perform the origin determining process properly and hence finds the process tedious and time-consuming.

Furthermore, the dicing apparatus includes a detecting unit having a light emitting element and a light detecting element that face each other across a clearance in the vicinity of the position of the cutting blade. When the tip end of the cutting blade is inserted into the clearance, the tip end of the cutting blade interrupts light emitted from the light emitting element and detected by the light detecting element, causing a change in the amount of light detected by the light detecting element. A home position for the cutting blade is determined on the basis of such a change in the amount of light detected by the light detecting element. However, the detecting unit is disposed separately from the chuck table. If the position of the detecting unit and the position of the upper surface of the chuck table are relatively shifted from each other or the cutting blade is worn or chipped or otherwise broken, then there is a problem that an accurate home position for the cutting blade cannot be determined.

It is therefore an object of the present invention to provide a measuring apparatus that is capable of detecting the positional relation between a processing tool such as a grinding stone or a cutting blade and a chuck table for holding a workpiece to be processed by the processing tool, without requiring the operator to be experienced and skilled for the detecting process.

In accordance with an aspect of the present invention, there is provided a measuring apparatus for measuring positional relation between a chuck table for holding a workpiece thereon and a processing tool for processing the workpiece held on the chuck table, the measuring apparatus including a broadband light source, a mirror for reflecting light emitted from the broadband light source to travel toward the processing tool, a chromatic aberration condensing lens disposed between the broadband light source and the mirror or between the mirror and the processing tool, a light branching unit branching reflected light from the processing tool that has been reflected by the mirror and traveled back through the chromatic aberration condensing lens, and a position detecting unit detecting a position of the processing tool on the basis of intensity of the reflected light that corresponds to a wavelength of the reflected light branched by the light branching unit.

Preferably, the measuring apparatus further includes a beam splitter disposed between the broadband light source and the mirror, for splitting light emitted from the broadband light source into a first optical path toward the mirror and a second optical path perpendicular to the first optical path, in which the chromatic aberration condensing lens is disposed between the broadband light source and the beam splitter, and the light emitted from the broadband light source is led to the mirror and the chuck table.

According to the present invention, by positioning the processing tool in an area where a plurality of focused spots corresponding to respective wavelengths of the light are formed by the chromatic aberration condensing lens, the distance between an upper surface of the chuck table and a lower surface of the processing tool is accurately detected, allowing a home position for controlling the processing tool to be determined without requiring the operator to be experienced and skilled for the detecting process. Moreover, the measuring apparatus can solve the problem that the distance between the upper surface of the chuck table and the lower surface of the processing tool cannot be accurately detected if the position of the position detecting unit detecting the position of the processing tool and the position of the upper surface of the chuck table are relatively shifted from each other.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENT

Figure 1:
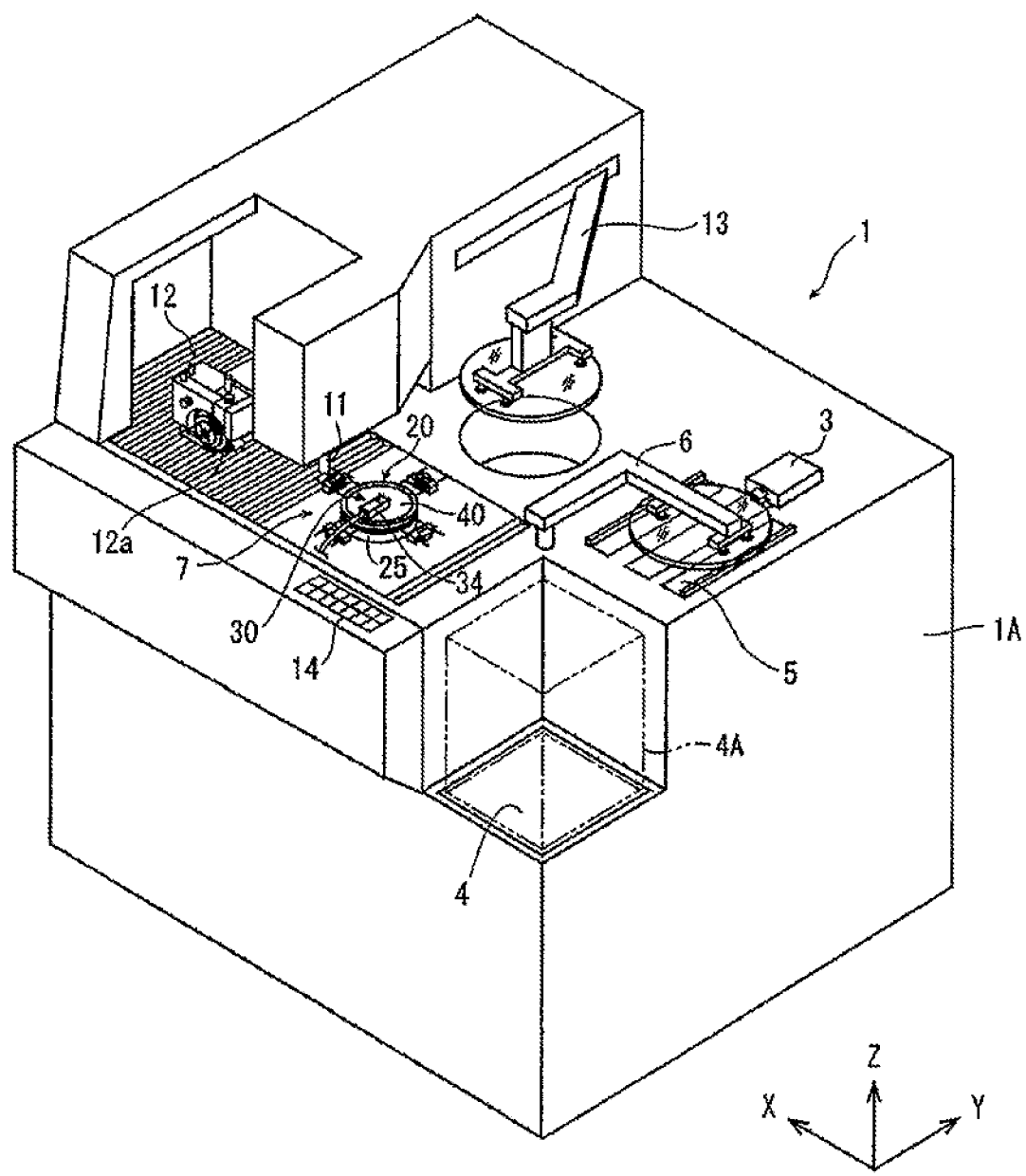
FIG. 1 is a perspective view of a dicing apparatus incorporating a measuring apparatus according to an embodiment of the present invention.

A measuring apparatus according to a preferred embodiment of the present invention will hereinafter be described below with reference to the accompanying drawings. FIG. 1 illustrates in perspective a dicing apparatus 1 incorporating a measuring apparatus 30 according to an embodiment of the present invention. As illustrated in FIG. 1, the dicing apparatus 1 includes a housing 1A substantially in the shape of a rectangular parallelepiped, a cassette 4A placed on a cassette rest area 4 of the housing 1A, an unloading/loading mechanism 3 for unloading a wafer as a workpiece from the cassette 4A onto a temporary rest table 5 on the housing 1A, a delivery mechanism 6 having a turn arm for delivering the wafer placed on the temporary rest table 5 to a holding unit 7 on the housing 1A, an image capturing unit 11 for capturing an image of the wafer held on the holding unit 7, a cutting unit 12 having an annular cutting blade 12a as a processing tool for cutting the wafer, a delivery mechanism 13 for delivering the wafer that has been cut from the holding unit 7 to a cleaning position on the housing 1A, and an operation panel 14 on the housing 1A used by the operator of the dicing apparatus 1 to establish processing conditions, etc.

The housing 1A of the dicing apparatus 1 houses therein an actuating mechanism, not illustrated, for moving a circular chuck table 20 of the holding unit 7 relatively to the cutting unit 12 in an X-axis direction indicated by the arrow X in FIG. 1. The cutting unit 12 incorporates an actuating mechanism, not illustrated, for moving a cutting blade 12a thereof in a Y-axis direction indicated by the arrow Y as an indexing feed direction and a Z-axis direction indicated by the arrow Z as a cutting direction. The chuck table 20 is supported on a hollow cylindrical member 25 that houses therein a rotating mechanism, not illustrated, for angularly moving the chuck table 20 about its own central axis through a desired angle in a circumferential direction.

The measuring apparatus 30 according to the present embodiment detects the positional relation between the holding unit 7 and the cutting blade 12a as the processing tool of the cutting unit 12 on the basis of the intensity of light. As illustrated in FIG. 1, the measuring apparatus 30 includes an optical system housing case 34 that is disposed on the chuck table 20 when the measuring apparatus 30 is in use. According to the embodiment illustrated in FIG. 1, the measuring apparatus 30 includes a disk-shaped support board 40 supporting the optical system housing case 34 thereon and held under suction on the chuck table 20. The optical system housing case 34 is held under suction on the chuck table 20 with the support board 40 interposed therebetween. The measuring apparatus 30 will be described in greater detail below with reference to FIGS. 1 and 2.

Figure 2:
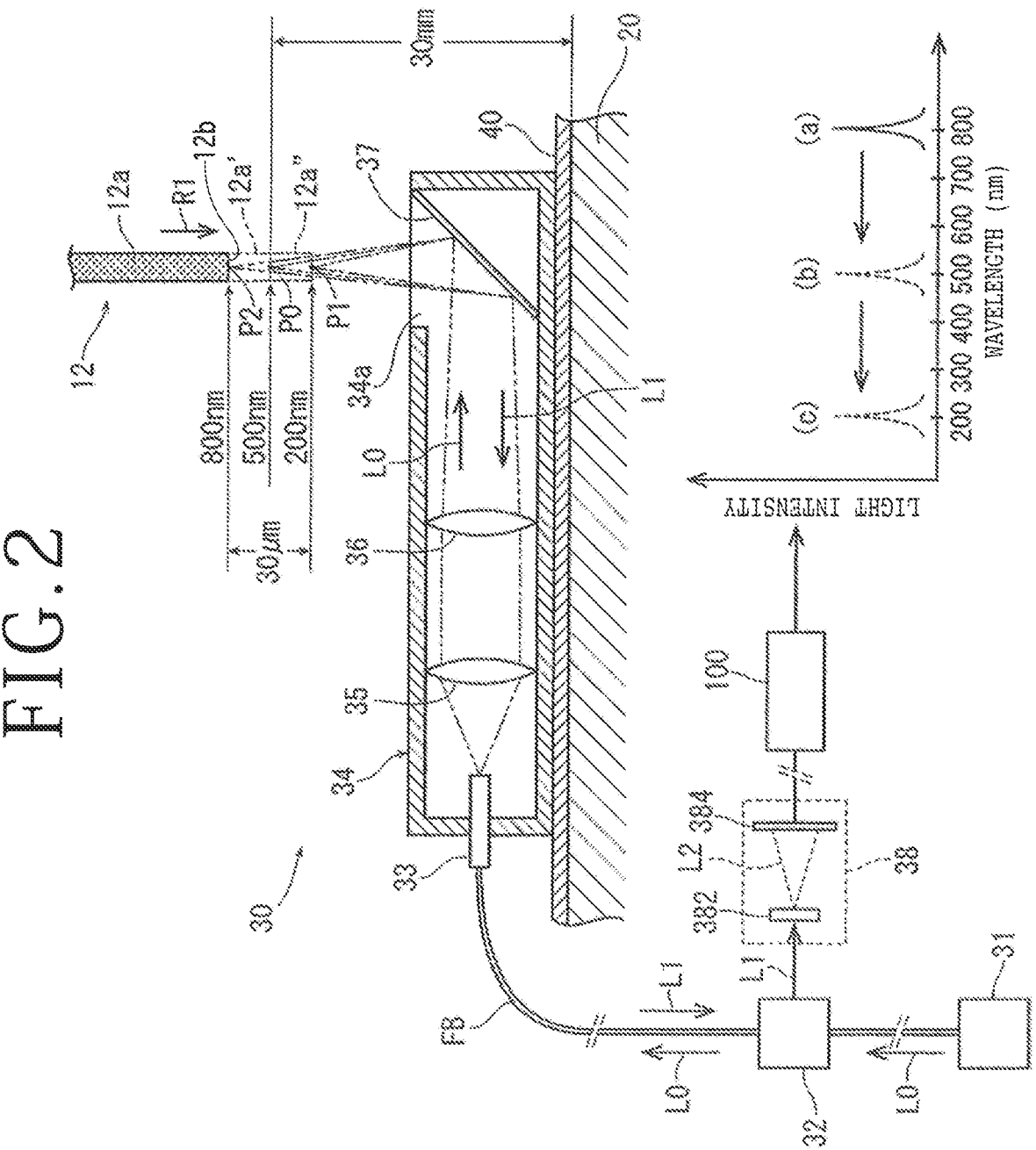
FIG. 2 is a cross-sectional view of an optical system housing case of the measuring apparatus illustrated in FIG. 1, the measuring apparatus being partly illustrated in block form.
Figure 5:
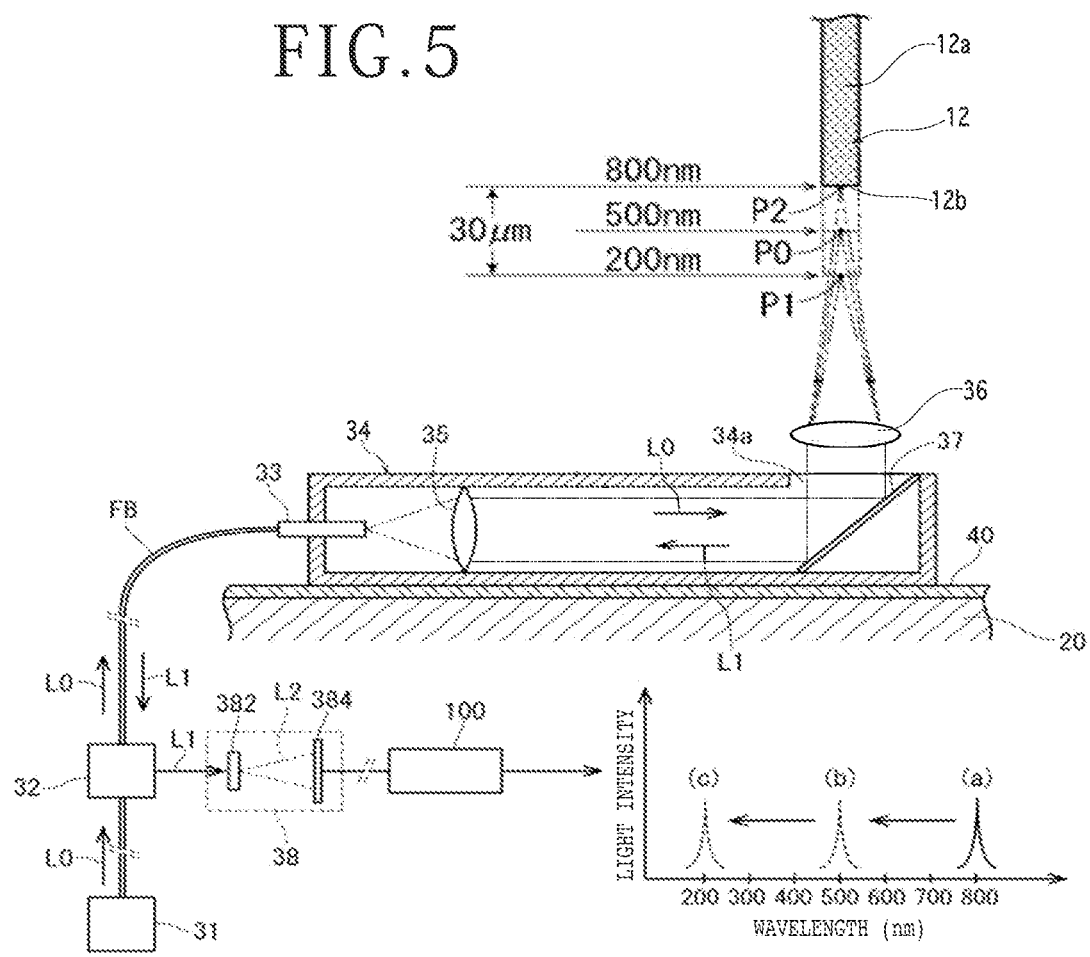
FIG. 5 is a cross-sectional view of an optical housing case of the measuring apparatus according to yet another embodiment of the present invention, the measuring apparatus being partly illustrated in block form.

As illustrated in FIG. 2, the measuring apparatus 30 according to the present embodiment includes a broadband light source 31 for emitting broadband light L0, an optical fiber FB for transmitting the light L0 emitted from the broadband light source 31 therethrough, a light branching unit 32 for directing the light L0 from the broadband light source 31 through the optical fiber FB toward the cutting blade 12a and branching reflected light L1 reflected by and returning from the cutting blade 12a off the optical fiber FB, a light introducing unit 33 for introducing the light L0 into the optical system housing case 34 illustrated in cross section in FIG. 2, a collimator lens 35 disposed in the optical system housing case 34 for converting the light L0 introduced from the light introducing unit 33 into parallel light or collimated light L0, a chromatic aberration condensing lens 36 disposed in the optical system housing case 34 for receiving the parallel light L0 from the collimator lens 35, a mirror 37 disposed in the optical system housing case 34 for reflecting the light L0 traveling from the chromatic aberration condensing lens 36 through an opening 34a in the optical system housing case 34 toward the cutting blade 12a that is positioned above the optical system housing case 34, and a position detecting unit 38 for detecting the position of the cutting blade 12a on the basis of the intensity of light, i.e., light intensity, corresponding to the wavelength of the reflected light L1 reflected by the cutting blade 12a to travel back through the mirror 37, the chromatic aberration condensing lens 36, and the optical fiber FB and branched off the optical fiber FB by the light branching unit 32. Note that the present invention may not necessarily be limited to the illustrated embodiment. According to an alternative, for example, the chromatic aberration condensing lens 36 may be disposed between the mirror 37 and the cutting blade 12a, as shown in FIG. 5.

The broadband light L0 emitted by the broadband light source 31 may be white light containing a well-balanced spectrum of lights having wavelengths in the range from 150 to 850 nm, for example. The broadband light source 31 includes a lamp such as a halogen light source, a xenon lamp, a plasma light source, or the like. The range of the wavelengths of the lights contained in the broadband light L0 emitted by the broadband light source 31 is not limited to the range from 150 to 850 nm specified above, but may be narrower or wider than the above specified range, and hence is not restrictive.

The broadband light L0 emitted by the broadband light source 31 travels along the optical fiber FB through the light branching unit 32 and the light introducing unit 33 and is introduced into the optical system housing case 34. The light L0 introduced into the optical system housing case 34 is applied from the light introducing unit 33 to the collimator lens 35, which converts the light L0 to the parallel light L0 that is led to the chromatic aberration condensing lens 36. The chromatic aberration condensing lens 36 is a lens for converging the broadband light L0 led thereto onto focused spots over a predetermined interval on the optical axis depending on the wavelengths included in the light L0 that has passed through the chromatic aberration condensing lens 36.

According to the present embodiment, the light L0 that has passed through the chromatic aberration condensing lens 36 is reflected by the mirror 37 to change its optical path upwardly by 90°, so that the reflected light L0 travels upwardly through the opening 34a. The reflected light L0 traveling upwardly through the opening 34a is caused by the chromatic aberration condensing lens 36 to form focused spots at different positions on the optical path depending on the wavelengths included in the light L0 over a predetermined range that is 30 mm above the upper surface of the chuck table 20.

Specifically, the light having a wavelength of 500 nm that is contained in the light L0 is converged onto a focused spot P0 exactly at a vertical position 30 mm above the upper surface of the chuck table 20. In addition, the light having a wavelength shorter than 500 nm is converged onto a focused spot lower than the focused spot P0. For example, the light having a wavelength of 200 nm that is contained in the light L0 is converged onto a focused spot P1 at a vertical position that is 15 μm below the focused spot P0. The light having a wavelength longer than 500 nm is converted onto a focused spot higher than the focused spot P0. For example, the light having a wavelength of 800 nm that is contained in the light L0 is converged onto a focused spot P2 at a vertical position that is 15 μm above the focused spot P0. In other words, the light L0 emitted from the broadband light source 31 is caused by the chromatic aberration condensing lens 36 to converge into focused spots distributed in a range generally from −15 to +15 μm across a reference vertical position that is spaced 30 mm from the upper surface of the chuck table 20. The vertical positions of the focused spots P0, P1, AND P2 formed by the measuring apparatus 30 can be determined by way of experimentation, etc. in advance.

As illustrated in FIG. 2, when the lower tip end of the cutting blade 12a of the cutting unit 12 is positioned in the range including the focused spots P0, P1, AND P2 of the light L0, the light having the wavelength that has been converged onto the focused spot located at the position of the lower tip end of the cutting blade 12a is reflected as reflected light L1 by the lower tip end of the cutting blade 12a. The reflected light L1 is not the broadband light but the light mainly having the wavelength that has been converged onto the focused spot located at the position of the lower tip end of the cutting blade 12a, as described above.

The reflected light L1 reflected by the lower tip end of the cutting blade 12a travels back along the optical path followed by the light L0 emitted from the broadband light source 31, i.e., is reflected by the mirror 37 and travels back through the chromatic aberration condensing lens 36, the collimator lens 35, the light introducing unit 33, the optical fiber FB, etc. to the light branching unit 32. As illustrated in FIG. 2, the reflected light is branched by the light branching unit 32 into an optical path different from the optical path connected to the broadband light source 31 and is introduced into the position detecting unit 38. The light branching unit 32 is of an arrangement for branching the light passing through the optical fiber FB off the optical fiber FB, and may be a known optical circulator, for example.

For example, the position detecting unit 38 includes a diffraction grating 382 for separating the introduced reflected light L1 into different wavelengths and dispersing the reflected light L1 as dispersed light L2 of the different wavelengths, and a line sensor 384 for receiving the dispersed light L2 and detecting the light intensities at the wavelengths depending on the positions where the dispersed light L2 is received on the line sensor 384. The line sensor 384 is a sensor having a plurality of photodetectors such as charge coupled devices (CCDs) or the like arrayed in a predetermined direction. The photodetectors of the line sensor 384 detect the light intensities. The line sensor 384 outputs a light intensity signal representing the detected light intensities to a control unit 100, which detects the wavelengths and light intensities of the reflected light L1 on the basis of the signal from the line sensor 384, i.e., the position detecting unit 38.

The measuring apparatus 30 according to the present embodiment and the dicing apparatus 1 that incorporates the measuring apparatus 30 therein are generally of the structure described above. A method of measuring the positional relation between the upper surface of the chuck table 20 of the holding unit 7 and the lower tip end 12b of the cutting blade 12a, used as the processing tool, of the cutting unit 12, using the measuring apparatus 30 will be described below.

First, as described above with reference to FIG. 1, the optical system housing case 34 of the measuring apparatus 30 is securely disposed on the disk-shaped support board 40, and held under suction on the chuck table 20 of the holding unit 7 of the dicing apparatus 1 with the support board 40 interposed therebetween. At this time, the center of the opening 34a in the optical system housing case 34 is aligned with the center of the chuck table 20.

With the optical system housing case 34 held under suction on the chuck table 20, the actuating mechanism, not illustrated, in the housing 1A is operated to move the chuck table 20 in the X-axis direction to position the center of the opening 34a in the optical system housing case 34 directly below the image capturing unit 11. The image capturing unit 11 is energized to detect the coordinates of the center of the light L0 that is emitted upwardly from the opening 34a, thereby performing an alignment process.

After the alignment process has been performed as described above, the actuating mechanism, not illustrated, in the housing 1A is operated to move the chuck table 20 further in the X-axis direction, and the actuating mechanism of the cutting unit 12 is operated to move the cutting blade 12a in the Y-axis direction to a position directly above the coordinates of the center of the opening 34a in the optical system housing case 34. Then, as illustrated in FIG. 2, the cutting blade 12a is lowered in the direction indicated by the arrow R1 to a vertical position that is 30 mm above the upper surface of the chuck table 20. At this time, the position of the lower tip end of the cutting blade 12a may not necessarily be exactly 30 mm above the upper surface of the chuck table 20, but may have a certain error due to a control error of the cutting unit 12, a configurational variation of the cutting blade 12a, etc.

As described above, when the lower tip end of the cutting blade 12a is controlled to move to the vertical position that is 30 mm above the upper surface of the chuck table 20, the position of the lower tip end of the cutting blade 12a is assumed to have an error in the range of ±15 μm, i.e., 30 μm, in the dicing apparatus 1 according to the present embodiment. Now, the broadband light source 31 of the measuring apparatus 30 is energized to emit the light L0 as white light. As described above, the light L0 emitted from the broadband light source 31 travels through the optical path provided by the optical fiber FB, the light branching unit 32, the light introducing unit 33, the collimator lens 35, the chromatic aberration condensing lens 36, and the mirror 37 and is converged into focused spots in an area where the lower tip end 12b of the cutting blade 12a exists. Because of the chromatic aberration condensing lens 36 through which the light L0 travels, the light L0 is converged into focused spots at different positions over a predetermined interval on the optical axis depending on the wavelengths included in the light L0, distributed in a range including the vertical position that is spaced 30 mm from the upper surface of the chuck table 20. In case the lower tip end of the cutting blade 12a is in the position P2, as illustrated in FIG. 2, the lower tip end of the cutting blade 12a reflects the light having the wavelength of 800 nm and converged onto the focused spot P2 most intensively and reflects lights having other wavelengths less intensively.

The reflected light L1 reflected from the lower tip end of the cutting blade 12a at the position P2 is reflected by the mirror 37 and travels back through the chromatic aberration condensing lens 36, the collimator lens 35, the light introducing unit 33, and the optical fiber FB to the light branching unit 32. The light branching unit 32 branches the reflected light L1 toward the position detecting unit 38, rather than the broadband light source 31. The reflected light L1 branched toward the position detecting unit 38 is led to the diffraction grating 382 thereof. As described above, the diffraction grating 382 has a function to separate applied light into different wavelengths and disperse the light as dispersed light of the different wavelengths. When the reflected light L1 reflected by the lower tip end of the cutting blade 12a travels through the diffraction grating 382, the reflected light L1 is turned into the dispersed light L2 of different wavelengths, and the dispersed light L2 is applied to the line sensor 384. The dispersed light L2 is not the broadband light but represents the most intensively reflected light from the light having the wavelength of 800 nm and converged into the focused spot at the position P2. In response to the applied dispersed light L2, the line sensor 384 produces and outputs a light intensity signal to the control unit 100. The control unit 100 then can obtain a waveform (a) indicated by the solid-line curve, for example, illustrated in a lower right section of FIG. 2.

Figure 3:
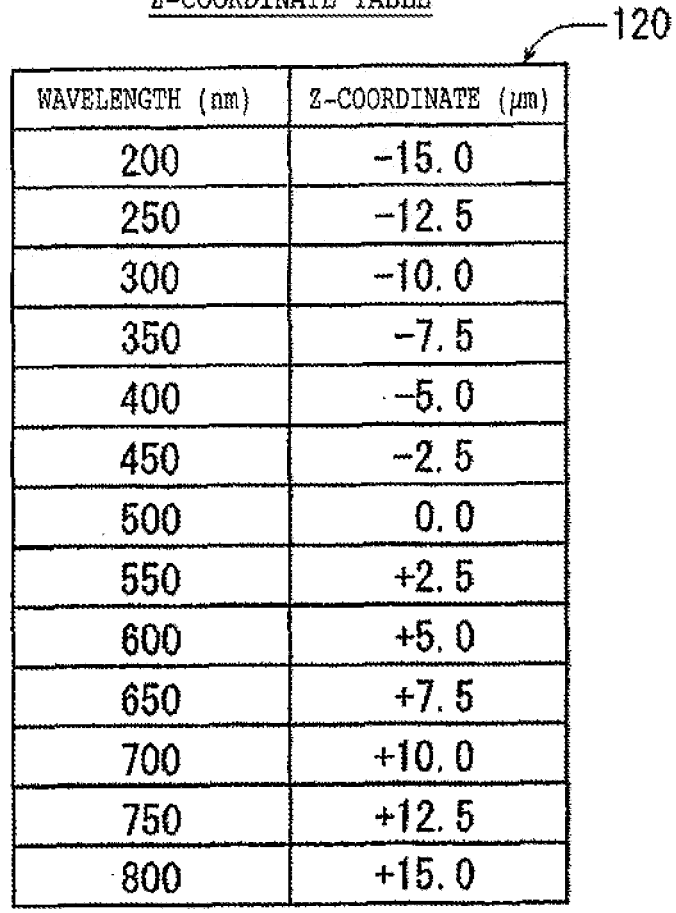
FIG. 3 is a diagram illustrating a Z-coordinate table stored in a control unit of the measuring apparatus.

As described above, if it is detected from the dispersed light L2 that a light intensity peak is formed at the position corresponding to the wavelength of 800 nm, then a Z-coordinate table 120 illustrated in FIG. 3 that is stored in the control unit 100 is referred to. The Z-coordinate table 120 represents recorded data of wavelengths at which waveform peaks detected by the line sensor 384 appear and Z-coordinate P2 values corresponding to the wavelengths. Specifically, in case a wavelength at which a peak appears is 800 nm, the corresponding Z-coordinate P2 value in the Z-coordinate table 120 is +15.0 µm. Therefore, the vertical position, i.e., the Z-coordinate P2, of the cutting blade 12a from the upper surface of the chuck table 20 is detected as the following.

Z=30 mm+15.0µm

In case the lower tip end of the cutting blade 12a is in a position 12a″ indicated by the two-dot-and-dash lines in FIG. 2, the light L0 is reflected by the lower tip end of the cutting blade 12a at a position indicated by P1. As the light having the wavelength of 200 nm is converged onto the focused spot P1, the line sensor 384 detects the dispersed light L2 from the reflected light L1 reflected at the position indicated by P1. Therefore, a light intensity peak appears at the position corresponding to the wavelength of 200 nm as indicated by a waveform (c) illustrated by the dotted-line curve in the lower right section of FIG. 2. By referring to the Z-coordinate table 120 illustrated in FIG. 3 on the basis of the waveform (c), it can be seen that the Z-coordinate value in the Z-coordinate table 120 is −15.0 µm. Therefore, the vertical position, i.e., the Z-coordinate, of the cutting blade 12a from the upper surface of the chuck table 20 is detected as the following.

Z=30 mm−15.0µm

Furthermore, in case the lower tip end of the cutting blade 12a is in a position 12a′ indicated by the two-dot-and-dash lines in FIG. 2, the light L0 is reflected by the lower tip end of the cutting blade 12a at a position indicated by P0. As the light having the wavelength of 500 nm is converged onto the focused spot P0, the line sensor 384 detects the dispersed light L2 from the reflected light L1 reflected at the position indicated by P0. Therefore, a light intensity peak appears at the position corresponding to the wavelength of 500 nm as indicated by a waveform (b) illustrated by the dotted-line curve in the lower right section of FIG. 2. By referring to the Z-coordinate table 120 illustrated in FIG. 3 on the basis of the waveform (b), it can be seen that the Z-coordinate value in the Z-coordinate table 120 is 0.0 µm. Therefore, the vertical position, i.e., the Z-coordinate, of the cutting blade 12a from the upper surface of the chuck table 20 is detected as the following.

Z=30 mm(+0.0µm)

As described above, the measuring apparatus 30 is able to accurately detect the position of the cutting unit 12 on the basis of the light intensity or peak corresponding to the wavelength of the reflected light L1 branched by the light branching unit 32. The Z-coordinate table 120 according to the present embodiment illustrated in FIG. 3 stores wavelengths at intervals of 50 nm and Z-coordinates at intervals of 2.5 µm. However, the present invention is not limited to such details. The diffraction grating 382 and the line sensor 384 may be of designs selected to provide a finer resolution for the detection of Z-coordinates, so that Z-coordinates can be detected with higher accuracy. According to the above embodiment, a Z-coordinate value is detected from the Z-coordinate table 120 and the vertical position, that is 30 mm above the upper surface of the chuck table 20, where the lower tip end of the cutting blade 12a is controlled to be positioned, is added to the detected Z-coordinate, thereby detecting a Z-coordinate position as the accurate position of the lower tip end of the cutting blade 12a. Rather, 30 mm may be added in advance to the Z-coordinates in the Z-coordinate table 120, so that the Z-coordinate table 120 directly stores Z-coordinate positions, i.e., vertical positions, for the lower tip end of the cutting blade 12a.

As described above, by accurately detecting the position of the cutting blade 12a of the cutting unit 12 with respect to the upper surface of the chuck table 20, a home position for controlling the cutting blade 12a can be accurately grasped, and the cutting blade 12a can be accurately positioned with respect to a workpiece to be cut by the cutting blade 12a.

Figure 4:
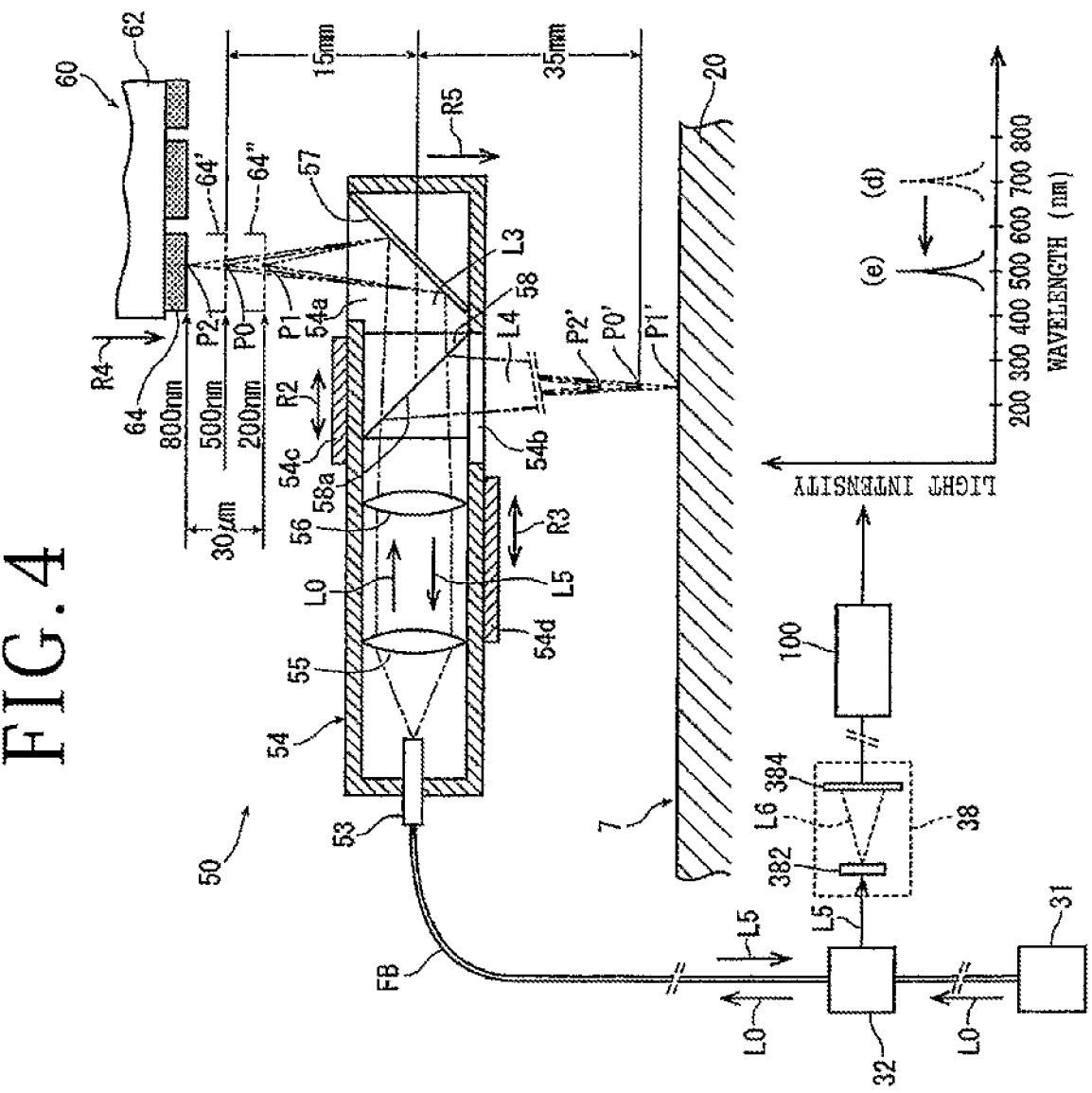
FIG. 4 is a cross-sectional view of an optical system housing case of a measuring apparatus according to another embodiment of the present invention, the measuring apparatus being partly illustrated in block form.

The present invention is not limited to the above embodiment, but various changes and modifications may be made therein. Another embodiment of the present invention will hereinafter be described below with reference to FIG. 4. FIG. 4 illustrates in cross section a measuring apparatus 50 according to the other embodiment of the present invention, the measuring apparatus 50 being partly illustrated in block form. According to the present embodiment, the measuring apparatus 50 is applied to a grinding unit 60 that is partly illustrated in FIG. 4. The measuring apparatus 50 will be described below in an application for detecting the position of the lower surface of grinding stones 64 of a grinding wheel 62 with respect to the upper surface of the circular chuck table 20 illustrated in cross section in FIG. 4. Those parts illustrated in FIG. 4 which are identical to those according to the preceding embodiment are denoted by identical reference characters, and their detailed description will be omitted below.

As with the preceding embodiment, the measuring apparatus 50 illustrated in FIG. 4 includes a broadband light source 31 for emitting broadband light L0, an optical fiber FB for transmitting the light L0 emitted from the broadband light source 31 therethrough, a light branching unit 32 for directing the light L0 from the broadband light source 31 through the optical fiber FB and branching reflected light L1 off the optical fiber FB, a light introducing unit 53 for introducing the light L0 into an optical system housing case 54, a collimator lens 55 disposed in the optical system housing case 54 for converting the light L0 introduced from the light introducing unit 53 into parallel light L0, a chromatic aberration condensing lens 56 disposed in the optical system housing case 54 for receiving the parallel light L0 from the collimator lens 55, a mirror 57 disposed in the optical system housing case 54 for reflecting the light L0 traveling from the chromatic aberration condensing lens 56 through a first opening 54a in the optical system housing case 54 toward the grinding stones 64 that are positioned above the optical system housing case 54, and a position detecting unit 38 for detecting the position of the cutting blade 12a. The measuring apparatus 50 also includes a beam splitter 58 disposed between the broadband light source 31 and the mirror 57, or more specifically disposed in the optical system housing case 54 between the chromatic aberration condensing lens 56 and the mirror 57, for splitting the optical path of the light L0 into a first optical path L3 toward the mirror 57 and a second optical path L4 perpendicular to the first optical path L3.

The beam splitter 58 includes two right-angled triangular glass prisms glued together at their hypotenuses with an optical thin film interposed therebetween, that provides an oblique surface 58a having a beam splitting function. When the light L0 emitted from the broadband light source 31 is applied to the beam splitter 58, the light L0 is split by the oblique surface 58a into two lights, one traveling straight through the oblique surface 58a along the first optical path L3 and one reflected by the oblique surface 58a to travel along the second optical path L4 perpendicular to the first optical path L3. As illustrated in FIG. 4, the chromatic aberration condensing lens 56 is disposed between the broadband light source 31 and the beam splitter 58, or more specifically disposed in the optical system housing case 54 between the collimator lens 55 and the beam splitter 58.

A first shutter 54c and a second shutter 54d are movably disposed on outer surfaces of the optical system housing case 54. The first shutter 54c is movable in the directions indicated by the arrow R2 to open and close the first opening 54a in the optical system housing case 54. The first optical path L3 extending from the beam splitter 58 to the mirror 57 is bent upwardly thereby to extend through the first opening 54a toward the grinding stones 64. The second shutter 54d is movable in the directions indicated by the arrow R3 to open and close a second opening 54b in the optical system housing case 54. The second optical path L4 extending from the beam splitter 58 extends downwardly through the second opening 54b. According to the present embodiment, when the first opening 54a is opened by the first shutter 54c, the second opening 54b is closed by the second shutter 54d. Conversely, when the second opening 54b is opened by the second shutter 54d, the first opening 54a is closed by the first shutter 54c. The optical system housing case 54 is positioned directly above the center of the chuck table 20 by a fixing jig, not illustrated, when the measuring apparatus 50 is in use. A method of detecting the position of the lower surface of the grinding stones, used as a processing tool, 64, using the measuring apparatus 50 will be described below with reference to FIG. 4.

With the optical system housing case 54 positioned above the chuck table 20 by the fixing jig described above, the chuck table 20 is moved to position a region of the optical system housing case 54 that includes the central position of the first opening 54a directly below one of the grinding stones 64 of the grinding unit 60.

Then, the grinding wheel 62 is lowered in the direction indicated by the arrow R4 to a vertical position that is 50 mm above the upper surface of the chuck table 20. At this time, the position of the lower surface of the grinding stone 64 may not necessarily be exactly 50 mm above the upper surface of the chuck table 20, but may have a certain error due to a control error of the grinding unit 60, a configurational variation of the grinding stone 64, etc.

Then, the first opening 54a in the optical system housing case 54 in the measuring apparatus 50 is closed by the first shutter 54c and the second opening 54b in the optical system housing case 54 is opened by the second shutter 54d. Now, the broadband light source 31 of the measuring apparatus 50 is energized to emit the light L0. As described above, the light L0 emitted from the broadband light source 31 travels through the optical path provided by the optical fiber FB, the light branching unit 32, the light introducing unit 53, the collimator lens 55, and the chromatic aberration condensing lens 56 to the oblique surface 58a of the beam splitter 58, which reflects the light L0 to travel along the second optical path L4 toward the upper surface of the chuck table 20. In this condition, then, the optical system housing case 54 is slightly lowered in the direction indicated by the arrow R5 until it reaches a predetermined position when the light L0 travelling along the second optical path L4 is converged onto a focused spot P1' on the upper surface of the chuck table 20. The upper surface of the chuck table 20 reflects the light L0 as reflected light L5 that travels back along the optical path followed by the light L0. The reflected light L5 is branched off the optical fiber FB by the light branching unit 32 and dispersed by the diffraction grating 382 of the position detecting unit 38 into dispersed light L6, which is detected by the line sensor 384. At this time, for example, a light intensity peak appears at the position corresponding to the wavelength of 700 nm as indicated by a waveform (d) illustrated by the dotted-line curve in a lower right section of FIG. 4. According to the present embodiment, the light having a wavelength of 500 nm is converged onto a focused spot P0' at a position that is spaced 35 mm from the center of the optical axis along which the light L0 travels to the right in the optical system housing case 54. Therefore, by further slightly lowering the optical system housing case 54, the light intensity peak waveform detected by the position detecting unit 38 is moved to the position corresponding to the wavelength of 500 nm as indicated by a waveform (e) illustrated by the solid-line curve in the lower right section of FIG. 4. The distance from the center of the optical axis along which the light L0 travels to the right in the optical system housing case 54 to the upper surface of the chuck table 20 is can thus accurately set to 35 mm.

As described above, once the distance from the center of the optical axis along which the light L0 travels in the optical system housing case 54 to the upper surface of the chuck table 20 has been exactly set to 35 mm, the second opening 54b is then closed by the second shutter 54d and the first opening 54a is opened by the first shutter 54c. The light that has traveled along the first optical path L3 in the optical system housing case 54 is reflected by the mirror 57 and travels through the first opening 54a to the grinding stone 64 positioned above the optical system housing case 54. As described above, the focused spot of the light L0 that has traveled through the collimator lens 55 to the chromatic aberration condensing lens 56 is set to be formed at a position that is 35 mm spaced from the oblique surface 58a of the beam splitter 58. According to the present embodiment, the distance from the oblique surface 58a to the mirror 57 is set to 20 mm. Therefore, the light split by the oblique surface 58a and reflected by the mirror 57 to travel to travel along the first optical path L3 toward the grinding stone 64 is converged onto focused spots at different positions on the first optical path L3 depending on the wavelengths included in the light L0 over a predetermined range that is 15 mm above the center of the mirror 57, i.e., that is approximately 50 mm above the upper surface of the chuck table 20. In case the lower end of the grinding stone 64 exists at the position P2, as illustrated in FIG. 4, the lower end of the grinding stone 64 reflects the light converged onto the focused spot at the position P2 most intensively and reflects lights having other wavelengths less intensively.

The reflected light L5 reflected by the lower end of the grinding stone 64 at the position P2 described above is reflected by the mirror 57 and travels back through the beam splitter 58, the chromatic aberration condensing lens 56, the collimator lens 55, the light introducing unit 53, and the optical fiber FB to the light branching unit 32. The light branching unit 32 branches the reflected light L5 toward the position detecting unit 38, rather than the broadband light source 31. The reflected light L5 branched toward the position detecting unit 38 is led to the diffraction grating 382 thereof. As described above, the diffraction grating 382 has a function to separate applied light into different wavelengths and disperse the light as dispersed light of the different wavelengths. When the reflected light L5 reflected by the lower end of the cutting blade 12a travels through the diffraction grating 382, the reflected light L1 is turned into dispersed light L6 of different wavelengths, and the dispersed light L6 is applied to the line sensor 384. In response to the applied dispersed light L6, the line sensor 384 produces and outputs a light intensity signal to the control unit 100. For example, the control unit 100 can obtain waveforms representing peaks at different wavelengths illustrated in the lower right section of FIG. 2 according to the preceding embodiment as a result. In case the reflected light L5 reflected at the position P2 is led to the position detecting unit 38, the control unit 100 can obtain the waveform (a) indicated by the solid-line curve. It can thus be seen that a light intensity peak is formed at the position corresponding to the wavelength of 800 nm on the basis of the dispersed light L6 into which the reflected light L5 reflected at the position P2 has been dispersed.

As depicted above, if it is detected from the dispersed light L6 that a light intensity peak is formed at the position corresponding to the wavelength of 800 nm, then the Z-coordinate value in the Z-coordinate table 120 is found to be +15.0 µm by referring to the Z-coordinate table 120 illustrated in FIG. 3 that is stored in the control unit 100 in advance. Therefore, the vertical position, i.e., the Z-coordinate, of the vertical position of the cutting blade 12a from the upper surface of the chuck table 20 is detected as the following.

$Z=50$ mm+15.0µm

In case the lower end of the grinding stone 64 is in a position 64" indicated by the two-dot-and-dash lines in FIG. 4, the light L0 that has traveled along the first optical path L3 is reflected by the lower end of the grinding stone 64 at a position indicated by P1. As the light having the wavelength of 200 nm is converged onto the focused spot at the position P1, in case the reflected light L5 reflected by the lower end of the grinding stone 64 at the position P1 is led to the position detecting unit 38 and the dispersed light L6 is detected by the line sensor 384, a light intensity peak appears at the position corresponding to the wavelength of 200 nm as indicated by the waveform (c) illustrated by the dotted-line curve in the lower right section of FIG. 2. By referring to the Z-coordinate table 120 illustrated in FIG. 3 on the basis of the waveform (c), it can be seen that the Z-coordinate value in the Z-coordinate table 120 is −15.0 µm. Therefore, the vertical position, i.e., the Z-coordinate, of the grinding stone 64" from the upper surface of the chuck table 20 is detected as the following.

$Z=50$ mm−15.0µm

Furthermore, in case the lower end of the grinding stone 64 is in a position 64' indicated by the two-dot-and-dash lines in FIG. 4, the light L0 that has traveled along the first optical path L3 is reflected by the lower end of the grinding stone 64 at a position indicated by P0. As the light having the wavelength of 500 nm is converged onto the focused spot at the position P0, a light intensity peak appears at the position corresponding to the wavelength of 500 nm as indicated by the waveform (b) illustrated by the dotted-line curve in the lower right section of FIG. 2. By referring to the Z-coordinate table 120 illustrated in FIG. 3 on the basis of the waveform (b), it can be seen that the Z-coordinate value in the Z-coordinate table 120 is 0.0 µm. Therefore, the vertical position, i.e., the Z-coordinate, of the grinding stone 64' from the upper surface of the chuck table 20 is detected as the following.

$Z=50$ mm(+0.0µm)

According to the other embodiment described above, the measuring apparatus is able to accurately measure the positional relation between a holding unit holding a workpiece and a processing tool for processing the workpiece held on the holding unit. Furthermore, even in case the measuring apparatus 50 according to the present invention is applied to the grinding unit 60 of the grinding apparatus, the measuring unit 50 is able to detect the positional relation between the chuck table of the holding unit and the processing tool.

The present invention is not limited to the details of the above described preferred embodiments. The scope of the invention is defined by the appended claims and all changes and modifications as fall within the equivalence of the scope of the claims are therefore embraced by the invention.

What is claimed is:

1. A measuring apparatus for measuring positional relation between a chuck table for holding a workpiece thereon and a processing tool for cutting or grinding the workpiece held on the chuck table, the measuring apparatus comprising:
    a broadband light source;
    a mirror for reflecting light emitted from the broadband light source to travel toward a surface of the processing tool facing the workpiece;
    a chromatic aberration condensing lens disposed between the broadband light source and the mirror or between the mirror and the processing tool;
    a light branching unit branching reflected light from the surface of the processing tool facing the workpiece that has been reflected by the mirror and traveled back through the chromatic aberration condensing lens; and
    a position detecting unit detecting an intensity of the reflected light that corresponds to a wavelength of the reflected light branched by the light branching unit;

wherein a position of the processing tool is detected based on the intensity of the reflected light.

2. The measuring apparatus according to claim 1, further comprising:
a beam splitter disposed between the broadband light source and the mirror, for splitting light emitted from the broadband light source into a first optical path toward the mirror and a second optical path perpendicular to the first optical path; and
an optical system housing case housing the mirror and the beam splitter therein and having a first opening through which the first optical path passes and allows to reach light to the processing tool and a second opening through which the second optical path passes and allows to reach light to the chuck table,
wherein the chromatic aberration condensing lens is disposed between the broadband light source and the beam splitter, and a position of the chuck table is detected based on the intensity of the light reflected by the chuck table.

3. The measuring apparatus according to claim 1, wherein the processing tool is a cutting unit and the surface of the processing tool is a tip end of a cutting blade.

4. The measuring apparatus according to claim 1, wherein the processing tool is a grinding unit and the surface of the processing tool is a surface of a grinding stone facing the workpiece.

5. The measuring apparatus according to claim 2, wherein the processing tool is a grinding unit and the surface of the processing tool is a surface of a grinding stone facing the workpiece.

\* \* \* \* \*